United States Patent
Watson et al.

(10) Patent No.: US 7,763,130 B2
(45) Date of Patent: *Jul. 27, 2010

(54) THERMAL PROCESS TO IMPROVE METALLURGICAL CHARACTERISTICS

(75) Inventors: Daniel Martin Watson, 350 Jennifer La., Driftwood, TX (US) 78619; Billie Sunday Watson, Wimberley, TX (US)

(73) Assignee: Daniel Martin Watson, Driftwood, TX (US)

( * ) Notice: Subject to any disclaimer, the term of this patent is extended or adjusted under 35 U.S.C. 154(b) by 57 days.

This patent is subject to a terminal disclaimer.

(21) Appl. No.: 11/869,572

(22) Filed: Oct. 9, 2007

(65) Prior Publication Data

US 2008/0295926 A1 Dec. 4, 2008

Related U.S. Application Data

(63) Continuation-in-part of application No. 10/783,934, filed on Feb. 20, 2004, now Pat. No. 7,297,418.

(51) Int. Cl.
C21D 9/00 (2006.01)
(52) U.S. Cl. .................................... 148/578
(58) Field of Classification Search .................. 148/578
See application file for complete search history.

(56) References Cited

U.S. PATENT DOCUMENTS 6,141,974 A * 11/2000 Waldmann et al. ............. 62/62

7,163,595 B2 * 1/2007 Watson ........................ 148/577
2002/0179204 A1 * 12/2002 Brunson ...................... 148/578

FOREIGN PATENT DOCUMENTS

SU 956894 A * 9/1982

OTHER PUBLICATIONS

English abstract of SU 956894 A.*

* cited by examiner

Primary Examiner—Roy King
Assistant Examiner—Jie Yang
(74) Attorney, Agent, or Firm—Buskop Law Group, PC; Wendy Buskop

(57) ABSTRACT

A thermal process for treating a metal to improve at least one structural characteristic of the metal comprising: placing a metal with a metal temperature within a thermal control apparatus, introducing a cryogenic material to decrease the metal temperature, while preventing over-stressing of the metal, to a first target temperature ranging from −120 degrees Fahrenheit to −380 degrees Fahrenheit at a first temperature rate, ranging from degrees Fahrenheit per minute to 20 degrees Fahrenheit per minute, stopping the introduction of cryogenic material once the first target temperature is reached, and increasing the chamber temperature to a second target temperature ranging from 0 degrees Fahrenheit to 1400, and increasing the metal temperature to the second target temperature at a second temperature rate ranging from 0.25 degrees Fahrenheit per minute to 20 degrees Fahrenheit per minute, resulting in a treated metal without fractures.

16 Claims, 5 Drawing Sheets

FIGURE 3B

220 — Introducing a cryogenic material into the thermal control apparatus to decrease the intermediate metal carbide temperature while preventing the over-stressing of the metal carbide

230 — Lowering the temperature to a third target temperature ranging from -120 degrees F to -380 degrees F at a third temperature rate ranging from 0.25 degrees per minute to 20 degrees per minute

240 — Stopping the introduction of the cryogenic material into the chamber once the third target temperature is reached

250 — Increasing the chamber temperature to a fourth target temperature ranging from 0 degrees F to 1400 degrees F

260 — Increasing the metal carbide temperature to the fourth target temperature at a fourth temperature rate ranging from 0.25 degrees per minute to 20 degrees per minute

320 — Introducing a cryogenic material into the thermal control apparatus to decrease the metal carbide temperature without over-stressing of the metal carbide

FIGURE 3C

330 — Lowering the temperature to a fifth target temperature ranging from -120 degrees F to -380 degrees F at a fifth temperature rate ranging from 0.25 degrees per minute to 20 degrees per minute

340 — Stopping the introduction of the cryogenic material into the chamber once the fifth target temperature is reached

350 — Increasing the chamber temperature to a sixth target temperature ranging from 0 degrees F to 1400 degrees F

360 — Increasing the metal carbide temperature to the sixth target temperature at a fourth temperature rate ranging from 0.25 degrees per minute to 20 degrees per minute

270 — Forming a treated metal carbide without fractures

US 7,763,130 B2

THERMAL PROCESS TO IMPROVE METALLURGICAL CHARACTERISTICS

CROSS-REFERENCE TO RELATED APPLICATIONS

The present application is a continuation-in-part of application Ser. No. 10/783,934 filed on Feb. 20, 2004, Now U.S. Pat. No. 7,297,418.

FIELD

The present embodiments relate to thermal processes for treating metal carbides to improve their structural characteristics.

BACKGROUND

A need exists for a process to treat metal carbides and similar materials of manufacture and to increase their structural characteristics. For example, when manufacturing tools and tool components, machinery, engine parts, wear surfaces, and like articles made from various steels and materials used for high wear applications, the common practice is to subject the steel to one or more thermal process treatments. This is performed either before or after formation of the steel carbide, so as to modify the properties of at least the exterior of the components. These treatments can provide the articles with greater strength, enhanced conductivity, greater toughness, enhanced flexibility, longer wear life, and other similar benefits.

A number of thermal type processes are known in the metallurgical arts to enhance the properties of manufacturing materials, such as steels and the like. One widely used class of such metallurgical processes generally known as quenching typically involves forming an article of the desired metal containing material and then rapidly lowering the temperature of the article, followed by a return of the article to ambient temperature. The problem with the current processes, controlled or not, is the formation of residual stress in the material. This results in stressing the material and even possibly fracturing the material, rendering it useless.

A further enhancement process for manufacturing materials, such as steel, involves the formation of a nitride containing layer on the surface of an article of the metal containing material that hardens the material by forming nitrides such as metal nitrides at or near the surface of an article. The formed nitride surface layer may include extremely hard compounds containing nitrides such as CrN, $Fe_2N$, $Fe_3N$, and $Fe_4N$. The formed nitride layer tends to create compressive stresses that can lead to distortions in the article being treated.

A need exists for a thermal process that can be modified depending on the specific material being treated and does not create secondary stresses commonly associated with cryogenic and thermal temperature changes. The current art describes single wave processes that concentrates on the cryogenic target temperature and possibly one positive range temperature. The focus of the current art on the cryogenic target temperature does not give any regard to the material being treated. The cryogenic phase causes stresses in the metal, and the subsequent heat process also causes stresses in the material. The prior art has done little to deal with these secondary stresses. A need exists, for multi-wave thermal treatments in which the target temperatures are dictated by the material being treated.

A need has long existed for a thermal process to treat a metal carbide or article of manufacture to improve its structural characteristics.

The present embodiments meet these needs.

BRIEF DESCRIPTION OF THE DRAWINGS

The present embodiments will be explained in greater detail with reference to the appended Figures, in which.

Figure 1:
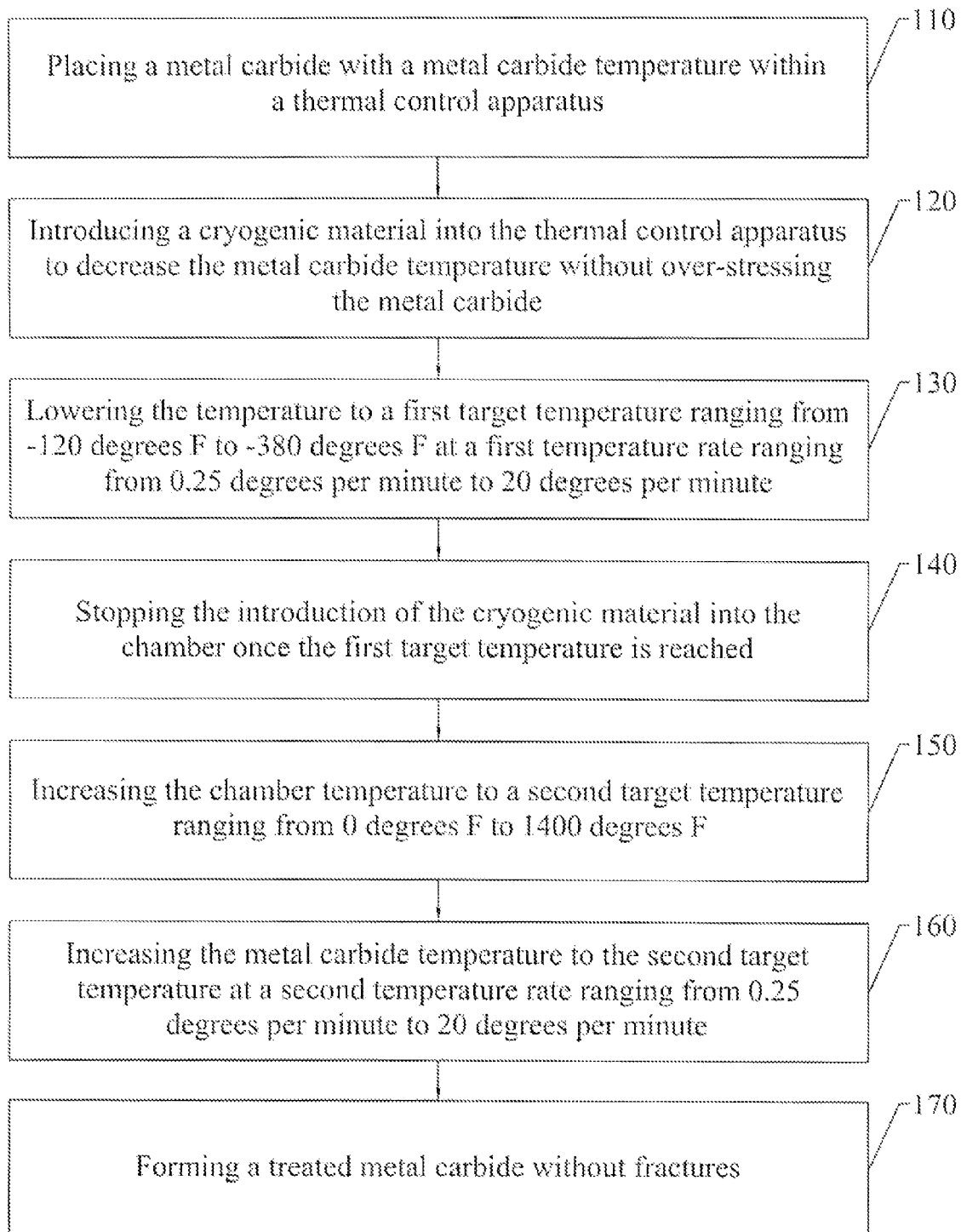
FIG. 1 is a schematic diagram of the steps of an embodiment of the present method.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular embodiments herein and can be practiced or carried out in various ways.

The present embodiments relate to a thermal process for treating a metal carbide to improve at least one structural or metallurgical characteristic of the metal carbide.

The process comprises placing a metal carbide with a metal carbide temperature within a thermal control apparatus. The thermal control apparatus comprises a chamber with a chamber temperature.

The chamber can be made from steel or other materials, can have any volume sufficient to contain the amount of metal carbide to be treated, and is capable of withstanding repeated applications of extreme hot and cold temperatures.

The chamber can also be a double-walled insulated chamber, a vacuum chamber, and a vacuum-insulated chamber.

The metal carbide can be any metal carbide, ferrous or non-ferrous, including but not limited to a bronze, a cobalt, a silver, a silver alloy, a nickel, a nickel alloy, a chromium, a chromium alloy, a vanadium, a vanadium alloy, a tungsten, a tungsten alloy, a titanium, a titanium alloy, a scandium, a scandium alloy, a tin, a platinum, a palladium, a gold, a gold alloy, a plated metal, a lead, a plutonium, an uranium, a zinc, an iron, an iron alloy, a magnesium, a magnesium alloy, a gallium, a gallium arsenide, a selenium, silicon, calcium, calcium fluoride, fused silica materials, germanium, indium, indium phosphide, phosphorous, and combinations thereof.

The metal carbide can also be a laminate. The laminate can be disposed on another material, such as a ceramic, a wood, a polymer, or combinations thereof. The metal carbide can also be a cermet.

A cryogenic material, such as vaporous hydrogen, nitrogen, oxygen, helium, argon, or combinations thereof, is introduced into the thermal control apparatus to decrease the metal temperature, while preventing over-stressing of the metal. The cryogenic material can be introduced through a valve, and the chamber temperature can be regulated through opening and closing the valve.

The metal carbide temperature is decreased to a first target temperature, which can range from about −120 degrees Fahrenheit to about −380 degrees Fahrenheit. The metal carbide temperature is decreased at a first temperature rate, which can range from about 0.25 degrees Fahrenheit per minute to about 20 degrees Fahrenheit per minute.

Through cryogenic treatment of the metal carbide, all of the individual particles that make up the carbide material are placed into their most stable state. These particles then are aligned optimally with surrounding particles. Also, molecular bonds of the metal carbide are strengthened by the process.

The extreme cold temperatures during cryogenic processing also slow movement at the atomic level, increasing internal molecular bonding energy and promoting a pure structural balance throughout the material. The end result is a material with an extremely uniform, refined and dense microstructure, with vastly improved metallurgical properties.

In an embodiment, the thermal control apparatus can further comprise a heat exchanger disposed in the chamber to provide a cryogenic vapor to the chamber.

The thermal process can further include releasing the cryogenic material into the heat exchanger, thereby absorbing heat from the chamber into the heat exchanger, forming a cryogenic vapor that fills the chamber.

The cryogenic vapor can be hydrogen, nitrogen, oxygen, helium, argon, or combinations thereof.

The introduction of the cryogenic material into the chamber is stopped once the first target temperature is reached, and the cryogenic temperature is held for at least two hours.

The holding of the metal carbide at the cryogenic temperature for at least two hours prevents breakage of the metal carbide due to inadequate penetration and stress cracking. Holding the metal carbide at the cryogenic temperature for a shorter time can increase the risk of stress cracking and cause lower performance of the metal carbide.

The chamber temperature is then increased to a second target temperature, that can range from about 0 degrees Fahrenheit to about 1400 degrees Fahrenheit. The metal carbide temperature is increased to the second target temperature at a second temperature rate, which can range from about 0.25 degrees Fahrenheit per minute to about 20 degrees Fahrenheit per minute. The second target temperature is then held for at least fifteen minutes.

Holding the second target temperature for at least fifteen minutes prevents the metal carbide from acquiring different stress from thermal variations across the material. This prevents shattering of the metal carbide. A holding time of shorter than fifteen minutes can cause uneven tempering, resulting in softening of the metal carbide, and creating a metal carbide with a ductile surface with a more brittle core.

The first temperature rate and the second temperature rate are carefully controlled to improve the characteristics of the metal carbide. Too rapid a rate of a temperature change can result in thermal shock and micro-cracking in the metal carbide. Larger items can require slower rates of temperature change, while smaller items can be cooled or heated more rapidly.

The steps of the process are repeated at least two times consecutively, resulting in a treated metal carbide without fractures.

The treated metal carbide without fractures can possess any number of improved structural characteristics when compared to the metal carbide that was initially placed within the thermal control apparatus. The treated metal carbide without fractures does not suffer from any over-stressing as a result of the thermal process, and is therefore far less likely to fracture, stress, crack, break, or deform than a metal carbide treated by other processes.

The first temperature rate can be different from the second temperature rate, to create a first desired metallurgical feature in the treated metal carbide without fractures. The first desired metallurgical feature can include improvements or changes in malleability, flexibility, ductility, hardness, elasticity, strength, or combinations thereof.

The first temperature rate can also be substantially the same as the second temperature rate.

The first temperature rate and the second temperature rate can also be determined by the mass of the metal carbide.

In an embodiment, the thermal process can further include the steps of introducing a cryogenic material into the thermal control apparatus to decrease the metal carbide temperature, while preventing over-stressing of the metal carbide, to a third target temperature at a third temperature rate. The third target temperature is colder than the first target temperature.

The embodiment then includes stopping the introduction of the cryogenic material into the chamber once the third target temperature is reached, increasing the metal carbide temperature to the fourth target temperature at a fourth temperature rate, resulting in the treated metal carbide without fractures.

The third temperature rate and the fourth temperature rate can be determined by the mass of the metal.

In a further embodiment, the thermal process can include introducing a cryogenic material into the thermal control apparatus to decrease the metal carbide temperature, while preventing over-stressing of the metal carbide, to a fifth target temperature at a fifth temperature rate.

The embodiment then includes stopping the introduction of the cryogenic material into the chamber once the fifth target temperature is reached, increasing the chamber temperature to a sixth target temperature, and increasing the metal carbide temperature to the sixth target temperature at a sixth temperature rate, resulting in the treated metal carbide without fractures.

The fifth temperature rate and the sixth temperature rate can be determined by the mass of the metal carbide.

In another embodiment, the described steps can be repeated at least four times. It is contemplated that the described steps may be repeated any number of times.

The thermal process, in an embodiment, can also include the step of permitting the metal carbide to remain at the first target temperature for a first period of time. The first period of time can range from about 15 minutes to about 96 hours.

In an embodiment, the thermal process can also include the step of permitting the metal carbide to remain at the second target temperature for a second period of time. The second period of time can range from about 15 minutes to about 48 hours.

The thermal process can be repeated to create a second desired metallurgical feature in the treated metal carbide without fractures. The second desired metallurgical feature can include improvements or changes in malleability, flexibility, ductility, hardness, elasticity, strength, or combinations thereof.

FIG. 1 provides one cycle of the steps of the process. It is contemplated that the steps depicted in FIG. 1 are performed at least two times consecutively. The depicted embodiment of the method begins by placing a metal carbide with a metal carbide temperature within a thermal control apparatus 110. The thermal control apparatus has a chamber that has a chamber temperature.

The next depicted step is introducing a cryogenic material into the thermal control apparatus to decrease the metal carbide temperature, without over-stressing the metal 120. This is followed by lowering the temperature to a first target temperature ranging from about −120 degrees Fahrenheit to about −380 degrees Fahrenheit at a first temperature rate ranging from about 0.25 degrees Fahrenheit per minute to about 20 degrees Fahrenheit per minute. 130.

The depicted embodiment continues with stopping the introduction of cryogenic material into the chamber once the first target temperature is reached 140. The embodiment then increases the chamber temperature to a second target temperature ranging from about 0 degrees Fahrenheit to about 1400 degrees Fahrenheit 150.

The embodiment then increases the metal carbide temperature at a second temperature rate ranging from about 0.25 degrees Fahrenheit per minute to about 20 degrees Fahrenheit per minute 160. The depicted embodiment concludes with forming a treated metal carbide without fractures 170.

Figure 2:
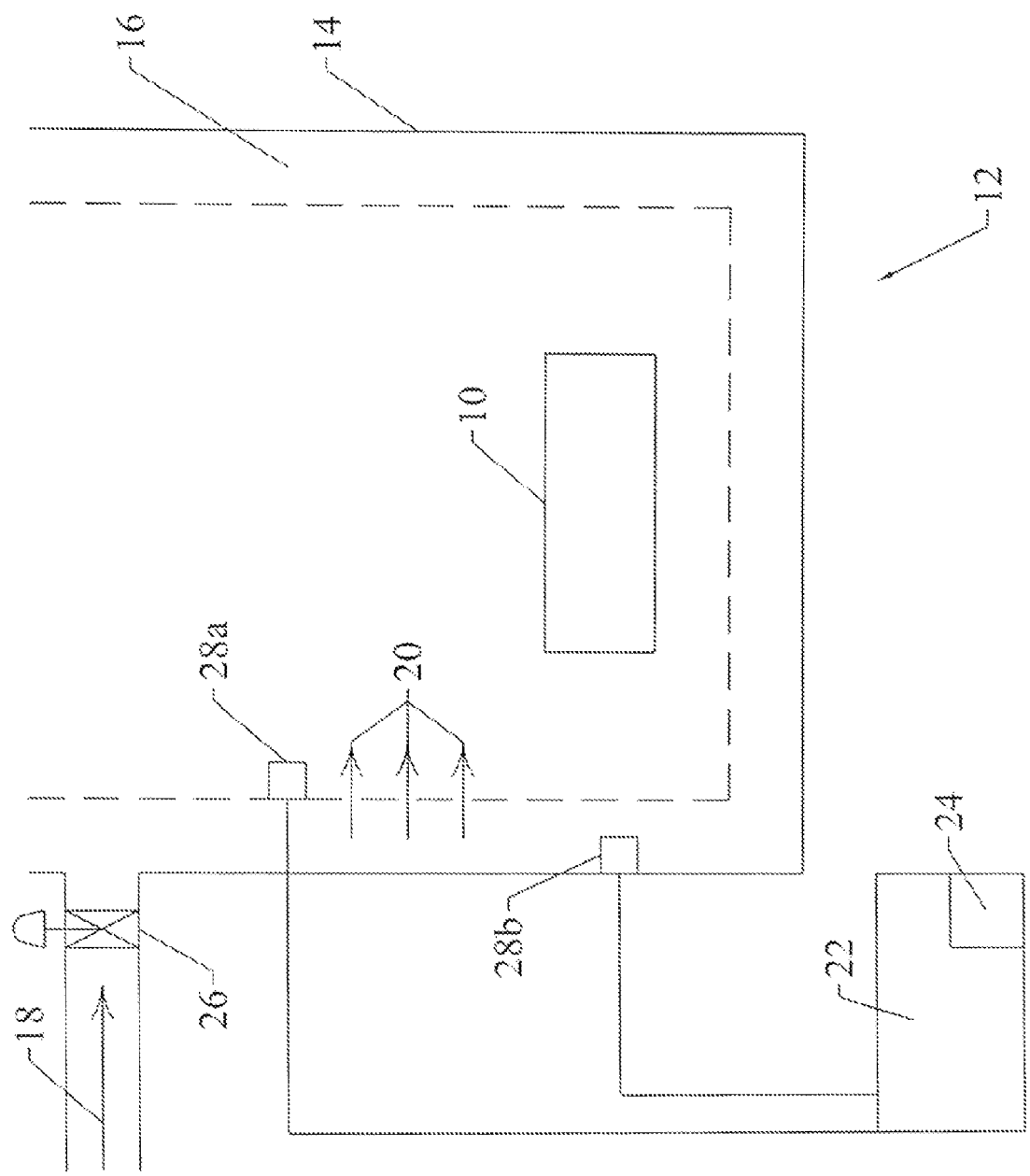
FIG. 2 depicts a detailed cross section of an embodiment of the thermal control apparatus used in the thermal process.

FIG. 2 shows a cross sectional detail of the thermal control apparatus 12 that comprises a chamber 14. In the embodiment depicted in FIG. 2, a cryogenic material 18 is introduced into the thermal control apparatus 12, through a valve 26, such that the chamber temperature of the chamber 14 increases or deceases depending on whether the valve 26 is open or closed. The chamber temperature of the chamber 14 can be closely regulated. Metal carbide 10 is shown within the chamber 14 of the thermal control apparatus 12.

The cryogenic material 18 is introduced into the thermal control apparatus 12 in order to decrease the metal carbide temperature of the metal carbide 10. The cryogenic material is added so that the metal carbide 10 is not over-stressed. Over-stressing can include fracturing the metal carbide. The metal carbide temperature of the metal carbide 10 is decreased to a first target temperature, which can range from about −120 degrees Fahrenheit to about −380 degrees Fahrenheit, at a first temperature rate, which can range from about 0.25 degrees Fahrenheit per minute to about 20 degrees Fahrenheit per minute. Once the first target temperature is reached, the cryogenic material 18 is no longer added to the chamber 14.

The thermal control apparatus 12 can further include a heat exchanger 16 located within the chamber 14 to provide a cryogenic vapor 20 to the chamber. The cryogenic material 18 can be released into the heat exchanger 16, thereby absorbing heat from the chamber 14 into the heat exchanger 16, forming a cryogenic vapor 20 that fills the chamber 14. Examples of cryogenic vapors contemplated in this invention can be hydrogen, nitrogen, oxygen, helium, argon, and combinations thereof.

The chamber 14 used in the thermal process can be a double-walled insulated chamber, a vacuum chamber, and a vacuum-insulated chamber. It is contemplated that computer control of the cryogenic process is possible using a computer 22. Computer 22 can include a dedicated microprocessor unit 24 to control injection of the cryogenic material 18 via a valve 26. The valve can be a solenoid-operated valve. Thermocouples 28a and 28b can provide real-time temperature measurement and feedback to the dedicated microprocessor unit 24, which then follows the programmed temperature targets and rates.

The depicted embodiment of the method continues by increasing the chamber temperature to a second target temperature which can range from about 0 degrees Fahrenheit to about 1400 degrees Fahrenheit. The metal carbide temperature of the metal carbide 10 is also increased to the second target temperature at a second temperature rate. The second temperature rate can range from about 0.25 degrees Fahrenheit per minute to about 20 degrees Fahrenheit per minute. It is contemplated that the steps of this cycle can be performed at least two times consecutively, resulting in a treated metal carbide without fractures.

In another embodiment, the first temperature rate is different from the second temperature rate to create a desired metallurgical feature in the treated metal carbide without fractures. Examples of the desired metallurgical features improved using this method include malleability, flexibility, ductility, hardness, elasticity, strength, and combinations thereof. The first temperature rate, however, can be substantially the same as the second temperature rate and create a similar effect on the metal carbide 10, resulting in a similarly improved treated metal carbide without fractures.

The invention also contemplates that additional thermal cycles can be applied to the metal carbide 10. The cryogenic material 18 is introduced, again, into the thermal control apparatus 12 to decrease the metal carbide temperature of the metal carbide 10 and prevent over-stressing of the metal carbide 10. The metal carbide temperature is decreased to a third target temperature at a third temperature rate. In the embodiment, the third target temperature is colder than the first target temperature.

The second cycle continues by stopping the introduction of the cryogenic material 18 into the chamber 14 once the third target temperature is reached. The chamber temperature of the chamber 14 is then increased to a fourth target temperature. The metal carbide temperature of the metal carbide 10 is likewise increased to the fourth target temperature at a fourth temperature rate. The second cycle results in a treated metal carbide without fractures with improved structural and metallurgical characteristics.

In the another embodiment, the thermal process comprises three cycles. In the third cycle, the cryogenic material 18 is again added to the thermal control apparatus 12 to decrease the metal carbide temperature while preventing over-stressing of the metal carbide 10. The metal carbide temperature is reduced to a fifth target temperature at a fifth temperature rate. When the fifth target temperature is reached, the cryogenic material 18 is no longer introduced into the chamber 14.

The third cycle continues by increasing the chamber temperature to a sixth target temperature and, thereby, increasing the metal carbide temperature to the sixth target temperature. The metal carbide temperature is increased at a sixth temperature rate, resulting in a treated metal carbide without fractures with improved structural and metallurgical characteristics.

Figure 3A:
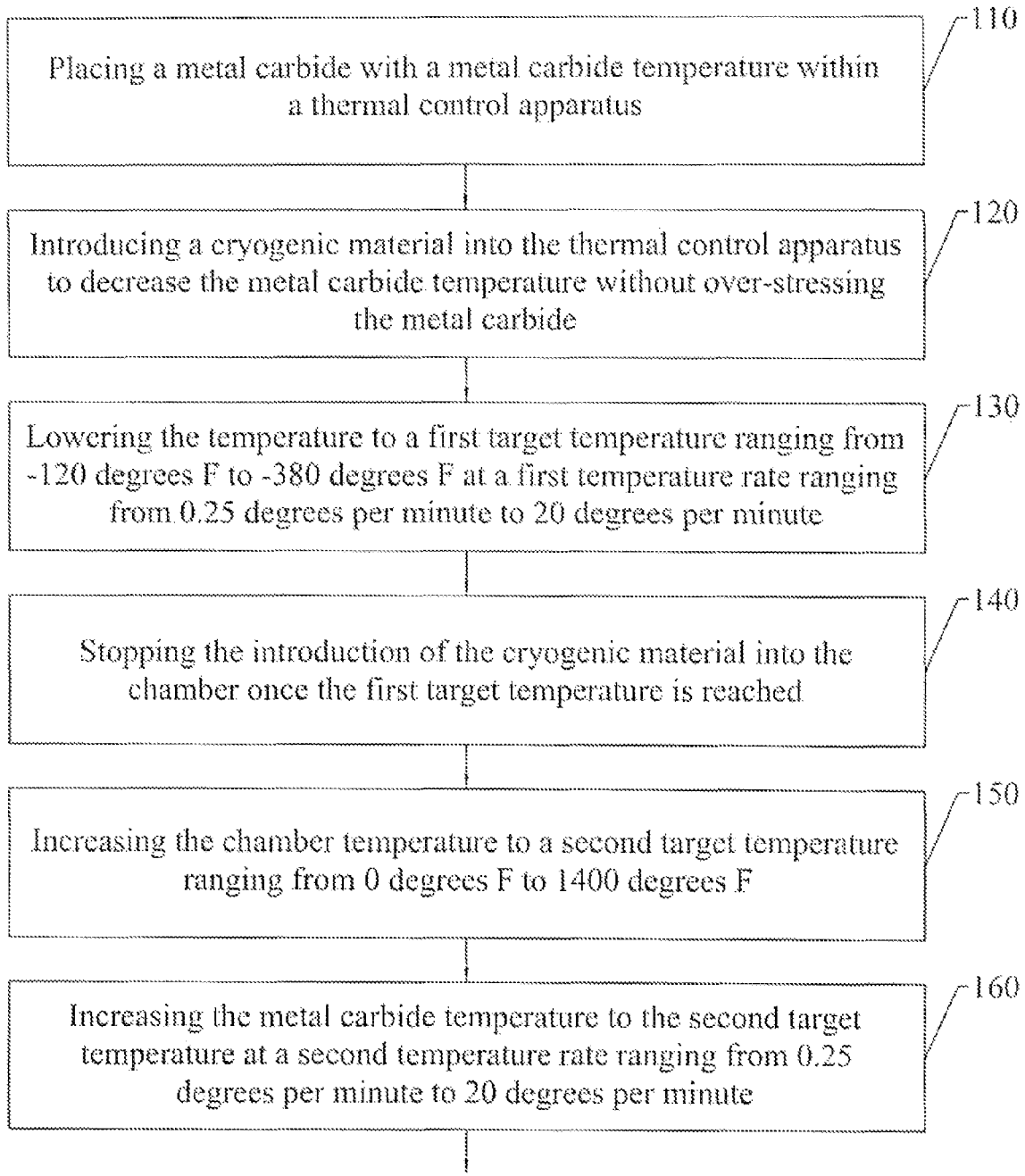
FIG. 3 is a schematic diagram that shows three thermal cycles of the method shown in FIG. 1.

FIG. 3 depicts an embodiment of the thermal process wherein the thermal process includes three thermal cycles resulting in a treated metal carbide without fractures and improved structural and metallurgical characteristics. The embodiment depicted in FIG. 3 relates to a metal carbide.

The embodiment depicted in FIG. 3 begins with placing a metal carbide with a metal carbide temperature within a thermal control apparatus 110. The method continues by introducing a cryogenic material into the thermal control apparatus to decrease the metal carbide temperature, while preventing over-stressing of the metal carbide 120.

The temperature is then lowered to a first target temperature ranging from about −120 degrees Fahrenheit to about −380 degrees Fahrenheit at a first temperature rate ranging from about 0.25 degrees Fahrenheit per minute to about 20 degrees Fahrenheit per minute 130. The introduction of the cryogenic material into the chamber can be stopped once the first target temperature is reached 140.

The chamber temperature is increased to a second target temperature ranging from about 0 degrees Fahrenheit to about 1400 degrees Fahrenheit 150. The metal carbide temperature is increased to the second target temperature at a second temperature rate ranging from about 0.25 degrees Fahrenheit per minute to about 20 degrees Fahrenheit per minute 160. Cryogenic material is then introduced into the thermal control apparatus to decrease the intermediate metal carbide temperature, while preventing over-stressing of the metal carbide 220.

The temperature is then lowered to a third target temperature ranging from about −120 degrees Fahrenheit to −380 degrees Fahrenheit at a third temperature rate ranging from 0.25 degrees Fahrenheit per minute to 20 degrees Fahrenheit per minute 230. The embodiment then stops the introduction of the cryogenic material into the chamber once the third target temperature is reached 240.

The chamber temperature is increased to a fourth target temperature ranging from about 0 degrees Fahrenheit to about 1400 degrees Fahrenheit 250. The metal carbide temperature is increased to the fourth target temperature at a fourth temperature rate ranging from about 0.25 degrees Fahrenheit per minute to about 20 degrees Fahrenheit per minute 260.

Additional cryogenic material is introduced into the thermal control apparatus to decrease the metal carbide temperature, while preventing over-stressing of the metal carbide 320. The temperature is lowered to a fifth target temperature ranging from about −120 degrees Fahrenheit to about −380 degrees Fahrenheit at a fifth temperature rate ranging from about 0.25 degrees Fahrenheit per minute to about 20 degrees Fahrenheit per minute 330.

The addition of cryogenic material into the chamber is stopped once the fifth target temperature is reached 340. The chamber temperature is increased to a sixth target temperature ranging from about 0 degrees Fahrenheit to about 1400 degrees Fahrenheit 350. The metal carbide temperature is increased to the sixth target temperature at a fourth temperature rate ranging from about 0.25 degrees Fahrenheit per minute to about 20 degrees Fahrenheit per minute 360. A treated metal carbide without fractures is formed 270.

The thermal process can further include the step of allowing the metal carbide to remain at the cold temperature for a period of time. The period of time can range from less than about 15 minutes to times longer than about 96 hours. The aging process for an elevated temperature can be as long as four days to relieve the stress in the metal carbide.

The temperature rates in each cycle can be determined by the mass of the metal carbide or other properties of the metal carbide. Basing the temperature ranges and rates on the qualities of the metal carbide relieves stresses, but creates new stress by super-solidification. Super-solidification is the increase in material density and organization due to the decrease of molecular movement in the material during the cryogenic treatment. The present embodiment of the method relieves the stresses created by the cryogenic portion of the treatment in the heat phases that follow the cooling. Through repeated chilling and heating, the molecules are condensed into a more highly organized configuration and relieved of the stresses created therein.

The heat phase temperature range and rate can be determined by the qualities of the metal carbide, such as malleability, flexibility, ductility, hardness, elasticity, strength, and combinations thereof. Repeated treatments result in the refinement of the molecular structure for the material being treated.

The types of metal carbides contemplated to be used by this process can include bronze, cobalt, silver, silver alloy, nickel, nickel alloy, chromium, chromium alloy, vanadium, vanadium alloy, tungsten, tungsten alloy, titanium, titanium alloy, scandium, scandium alloy, tin, platinum, palladium, gold, gold alloy, plated metal, lead, plutonium, uranium, zinc, iron, iron alloy, magnesium, magnesium alloy, gallium, gallium arsenide, selenium, silicon, calcium, calcium fluoride, fused silica materials, germanium, indium, indium phosphide, phosphorous and combinations thereof.

The metal carbide can also be a laminate alone or one disposed on a ceramic, a wood, a polymer, or combinations thereof. The metal carbide can also be a cermet.

An embodiment of the invention can comprise three thermal cycles of cryogenic treatment with a double heat treatment at the end. The first target temperature is known as the shallow chill. The third target temperature is known as the cold chill. A "heat process" is when the metal temperature is allowed to return to room temperature or anything above 0 degrees Fahrenheit. "Aging" is defined as holding the metal at room temperature for several days or weeks between chills. Aging is also effective when used in combinations with this thermal process.

The following is an example of a three wave or three cycle thermal process.

The first example is for enhancing the strength of steel. The steel is first placed in the thermal control apparatus. The temperature of steel is tempered to its appropriate temperature. The cryogenic material is introduced into the thermal control apparatus to lower the temperature of the steel to −120 degrees Fahrenheit at a rate of 1 degree Fahrenheit per minute. This temperature rate and target temperature increases the durability qualities of the steel. The steel is kept at the −120 degrees Fahrenheit temperature for at least two hours. The steel is then tempered to a second target temperature of 290 degrees Fahrenheit and maintained at that temperature for at least one hour. The second cycle begins by introducing the cryogenic material into the thermal control apparatus again. The temperature of the steel is lowered to a third target temperature of −300 degrees Fahrenheit and is maintained at that temperature for at least twenty-four hours. The steel is then tempered to a fourth target temperature of 290 degrees Fahrenheit and maintained at that temperature for at least one hour. The steel is then subjected to a third thermal cycle wherein the temperature of the steel is lowered to a fifth target temperature of −300 degrees Fahrenheit and is maintained at that temperature for at least twenty-four hours. Finally, the steel is tempered to a sixth target temperature of 290 degrees Fahrenheit and maintained at that temperature for at least one hour.

The second example is for increasing the hardness quality of steel. The steel is placed into the thermal control apparatus and is tempered to its appropriate temperature. The cryogenic material is introduced into the thermal control apparatus to lower the temperature of the steel to −120 degrees Fahrenheit at a rate of 10 degrees Fahrenheit per minute. The rapid temperature rate increases the hardness quality of the steel. The steel is maintained at −120 degrees Fahrenheit for at least two hours. The steel is then tempered to a second target temperature of 290 degrees Fahrenheit and maintained at that temperature for at least one hour. The steel is then subjected to two more thermal cycles. In each cycle, the cryogenic material is added to the thermal control apparatus, and the temperature of the steel is lowered to a temperature of −300 degrees Fahrenheit and maintained at that temperature for at least twenty-four hours. Each cycle ends by tempering the steel to a target temperature of 290 degrees Fahrenheit and maintaining that temperature for at least one hour.

For increasing corrosion resistance in steel, the temperature can be changed according to the mass of the steel. The temperature of the steel is lowered to −300 degrees Fahrenheit and maintained for at least twenty-four hours.

The third example is for weld enhancement, such as in 1080 wire. The wire is tempered to 900 degrees Fahrenheit and maintained at that temperature for at least six hours to deaden the weld. The weld is then subjected to a first thermal cycle where the temperature of the weld is reduced to −120 degrees Fahrenheit and maintained for at least one hour. The weld is then subjected to two more thermal cycles. In each cycle, the cryogenic material is added to the thermal control apparatus and the temperature of the weld is lowered to a temperature of −300 degrees Fahrenheit, and maintained at that temperature for at least twenty-four hours. Each cycle ends by tempering the weld to a target temperature of 290 degrees Fahrenheit and maintaining that temperature for at least one hour.

For increasing the durability of aluminum, the aluminum is subjected to a slow temperature rate, such as 1 degree Fahrenheit per minute. The slow temperature rate promotes the increased durability in the aluminum. The temperature of the aluminum is lowered to −120 degrees Fahrenheit and maintained at that temperature for at least two hours. The aluminum is then tempered to 120 degrees Fahrenheit and kept at that temperature for at least two hours.

For increasing the flexibility of aluminum, also know as annealing, the aluminum is subjected to high temperature rate, such as a rate greater than 10 degrees Fahrenheit per minute. The temperature of the aluminum is lowered to a temperature of −300 degrees Fahrenheit and maintained at the cold temperature for at least twenty-four hours.

While these embodiments have been described with emphasis on the preferred embodiments, it should be understood that within the scope of the appended claims the embodiments might be practiced other than as specifically described herein.

What is claimed is:

1. A multi-wave thermal process for treating a metal using repeated cryogenic chilling and repeated heating, to improve at least one structural characteristic of the metal comprising:
   a. placing the metal with a metal temperature within a thermal control apparatus comprising a chamber with a chamber temperature;
   b. selecting a first target temperature based on the metal, wherein the first target temperature ranges from −120 degrees Fahrenheit to −380 degrees Fahrenheit;
   c. selecting a first temperature rate based on the metal, a size of the metal, a mass of the metal, or combinations thereof, wherein the first temperature rate ranges from 0.25 degrees Fahrenheit per minute to 20 degrees Fahrenheit per minute;
   d. controlling the first temperature rate while cryogenically chilling the metal by introducing a first cryogenic material into the thermal control apparatus to decrease the metal temperature, while preventing over-stressing of the metal, to the first target temperature at the first temperature rate;
   e. stopping the introduction of the first cryogenic material into the chamber once the first target temperature is reached and holding the metal at the first target temperature for at least two hours;
   f. selecting a second target temperature for the metal, wherein the second target temperature ranges from 0 degrees Fahrenheit to 1400 degrees Fahrenheit;
   g. selecting a second temperature rate, wherein the second temperature rate ranges from 0.25 degrees Fahrenheit per minute to 20 degrees Fahrenheit per minute;
   h. controlling the second temperature rate while heating the metal to the second target temperature;
   i. increasing the metal temperature to the second target temperature at the second temperature rate and holding the metal at the second target temperature for at least fifteen minutes;
   j. selecting a third target temperature for the metal, wherein the third target temperature ranges from −120 degrees Fahrenheit to −380 degrees Fahrenheit;
   k. selecting a third temperature rate, wherein the third temperature rate ranges from 0.25 degrees Fahrenheit per minute to 20 degrees Fahrenheit per minute;
   l. controlling the third temperature rate while cryogenically chilling the metal by introducing a second cryogenic material into the thermal control apparatus to decrease the metal temperature, while preventing over-stressing of the metal, to the third target temperature at the third temperature rate;
   m. stopping the introduction of the second cryogenic material into the chamber once the third target temperature is reached and holding the metal at the third target temperature for at least two hours;
   n. selecting a fourth target temperature of the metal, wherein the fourth target temperature ranges from 0 degrees Fahrenheit to 1400 degrees Fahrenheit;
   o. selecting a fourth temperature rate, wherein the fourth temperature rate ranges from 0.25 degrees Fahrenheit per minute to 20 degrees Fahrenheit per minute;
   p. controlling the fourth temperature rate while increasing the chamber temperature to the fourth target temperature; and
   q. increasing the metal temperature to the fourth target temperature at the fourth temperature rate and holding the metal at the fourth target temperature for at least fifteen minutes resulting in a treated metal without fractures.

2. The thermal process of claim 1, wherein the first temperature rate is different from the second temperature rate to create a first desired metallurgical feature in the treated metal without fractures, wherein the first desired metallurgical feature is selected from the group consisting of: malleability, flexibility, ductility, hardness, elasticity, strength, and combinations thereof.

3. The thermal process of claim 1, wherein the first temperature rate is substantially the same as the second temperature rate.

4. The thermal process of claim 1, further comprising the steps of:
   a. introducing a third cryogenic material into the thermal control apparatus to decrease the metal temperature, while preventing over-stressing of the metal, to a fifth target temperature at a fifth temperature rate;
   b. stopping the introduction of the third cryogenic material into the chamber once the fifth target temperature is reached;
   c. increasing the chamber temperature to a sixth target temperature; and
   d. increasing the metal temperature to the sixth target temperature at a sixth temperature rate, resulting in the treated metal without fractures.

5. The thermal process of claim 4, further comprising repeating the steps at least four times.

6. The thermal process of claim 4, wherein the fifth temperature rate and the sixth temperature rate are determined by the metal.

7. The thermal process of claim 1, further comprising holding the metal at the first target temperature for a time ranging from two hours to 96 hours.

8. The thermal process of claim 1, further comprising holding the metal at the second target temperature for a time ranging from fifteen minutes to 48 hours.

9. The thermal process of claim 1, wherein the thermal process is repeated to create a second desired metallurgical feature in the treated metal without fractures, wherein the second desired metallurgical feature is selected from the group consisting of: malleability, flexibility, ductility, hardness, elasticity, strength, and combinations thereof.

10. The thermal process of claim 1, wherein the thermal control apparatus further comprises a heat exchanger disposed in the chamber to provide a cryogenic vapor to the chamber.

11. The thermal process of claim 10, wherein the first cryogenic material and the second cryogenic material are released into the heat exchanger thereby absorbing heat from the chamber into the heat exchanger forming the cryogenic vapor that fills the chamber.

12. The thermal process of claim 10, wherein the cryogenic vapor is a member of the group consisting of: hydrogen, nitrogen, oxygen, helium, argon, and combinations thereof.

13. The thermal process of the claim 1, wherein the chamber is selected from the group consisting of: a double-walled insulated chamber, a vacuum chamber, and a vacuum-insulated chamber.

14. The thermal process of the claim 1, wherein the third target temperature is lower than the first target temperature.

15. The thermal process of the claim 1, wherein the fourth target temperature is different than the second target temperature.

16. A multi-wave thermal process for treating a metal using repeated cryogenic chilling and repeated heating, to improve at least one structural characteristic of the metal comprising:
  a. placing the metal with a metal temperature within a thermal control apparatus comprising a chamber with a chamber temperature;
  b. selecting a first target temperature based on the metal, wherein the first target temperature is −120 degrees Fahrenheit or −300 degrees Fahrenheit, and wherein the at least one structural characteristic is selected from the group consisting of: strength, durability, hardness, weld enhancement, flexibility, or combinations thereof;
  c. selecting a first temperature rate based on the metal, wherein the first temperature rate is selected from the group consisting of: 1 degree Fahrenheit per minute, 10 degrees Fahrenheit per minute, or greater than 10 degrees Fahrenheit per minute;
  d. controlling the first temperature rate while cryogenically chilling the metal by introducing a first cryogenic material into the thermal control apparatus to decrease the metal temperature, while preventing over-stressing of the metal, to the first target temperature at the first temperature rate;
  e. stopping the introduction of the first cryogenic material into the chamber once the first target temperature is reached and holding the metal at the first temperature for a first hold time, wherein the first hold time is selected from the group consisting of: 1 hour, 2 hours, or 24 hours;
  f. selecting a second target temperature of the metal, wherein the second target temperature is 120 degrees Fahrenheit or 290 degrees Fahrenheit;
  g. selecting a second temperature rate based on the metal, wherein the second temperature rate is selected from the group consisting of 1 degree Fahrenheit per minute, 10 degrees Fahrenheit per minute, or greater than 10 degrees Fahrenheit per minute;
  h. controlling the second temperature rate while increasing the metal temperature to the second target temperature at the second temperature rate;
  i. holding the metal at the second target temperature for a second hold time, wherein the second hold time is selected from the group consisting of: 1 hour, 2 hours, or 6 hours;
  j. selecting a third target temperature based on the metal, wherein the third target temperature is −300 degrees Fahrenheit;
  k. selecting a third temperature rate based on the metal, wherein the third temperature rate ranges from 0.25 degrees Fahrenheit per minute to 20 degrees Fahrenheit per minute;
  l. controlling the third temperature rate while cryogenically chilling the metal by introducing a second cryogenic material into the thermal control apparatus to decrease the metal temperature, while preventing over-stressing of the metal, to the third target temperature at a third temperature rate;
  m. stopping the introduction of the second cryogenic material into the chamber once the third target temperature is reached and holding the metal at the third target temperature for a third hold time, wherein the third hold time is 24 hours;
  n. selecting a fourth target temperature based on the metal, wherein the fourth target temperature is 290 degrees Fahrenheit;
  o. selecting a fourth temperature rate based on the metal, wherein the fourth temperature ranges from 0.25 degrees Fahrenheit per minute to 20 degrees Fahrenheit per minute;
  p. controlling the fourth temperature rate while increasing the chamber temperature to the fourth target temperature;
  q. increasing the metal temperature to the fourth target temperature at the fourth temperature rate; and
  r. holding the metal at the fourth target temperature for a fourth hold time, wherein the fourth hold time is at least 1 hour, resulting in the treated metal without fractures.

* * * * *